Dec. 11, 1951　　A. T. HATTON ET AL　　2,577,892
MAGNETIC TESTING APPARATUS
Filed Nov. 29, 1945　　3 Sheets-Sheet 1
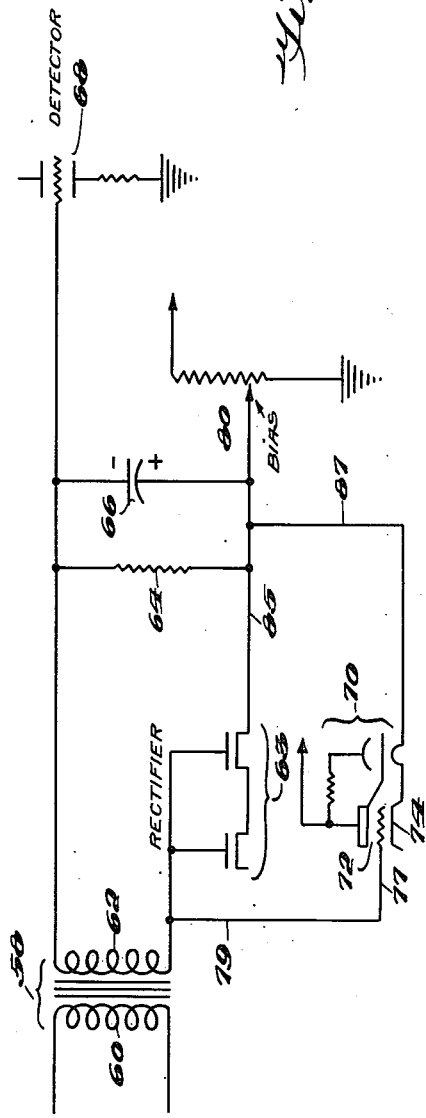
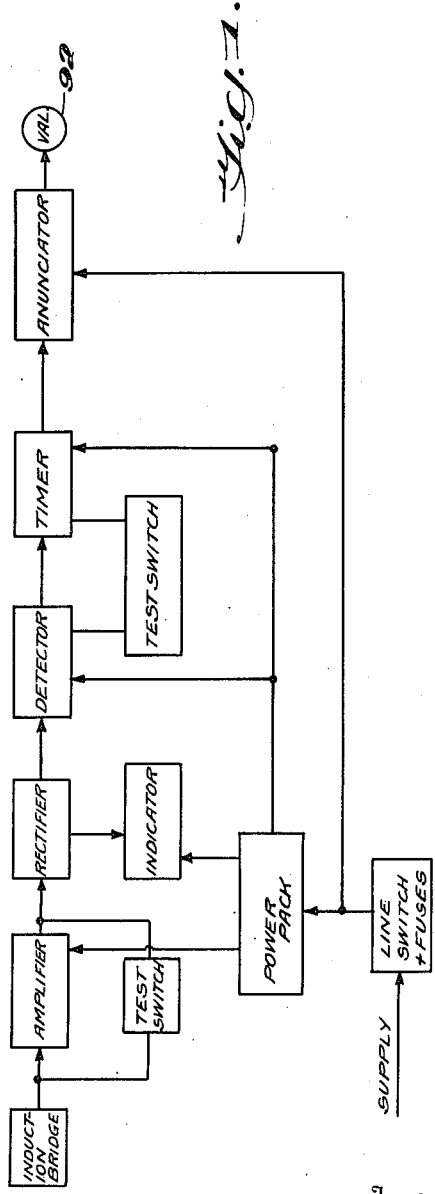
Inventors
ARTHUR T. HATTON,
ENOCH K. SPRAGUE,
By Robert B. Pearson
Attorney

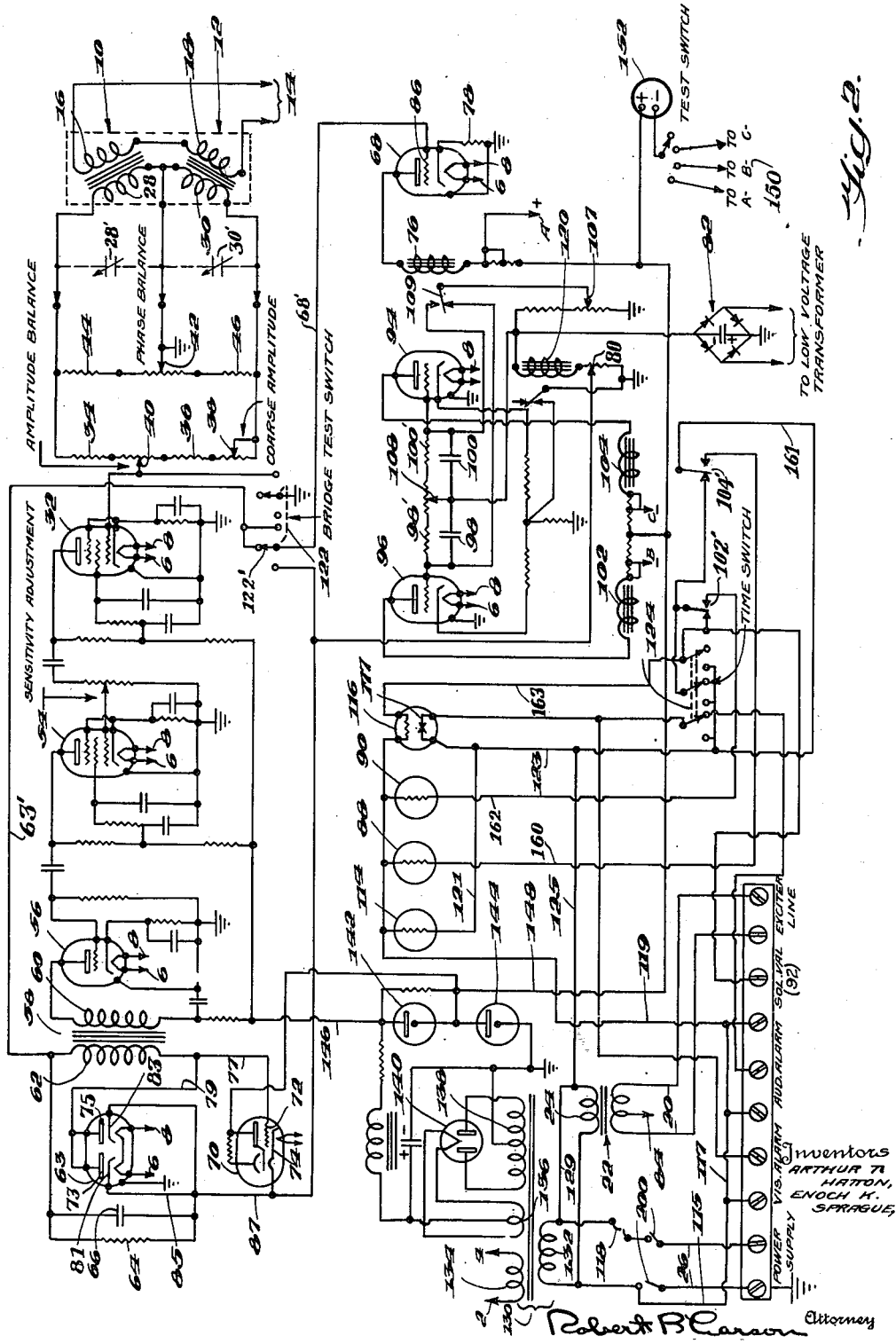

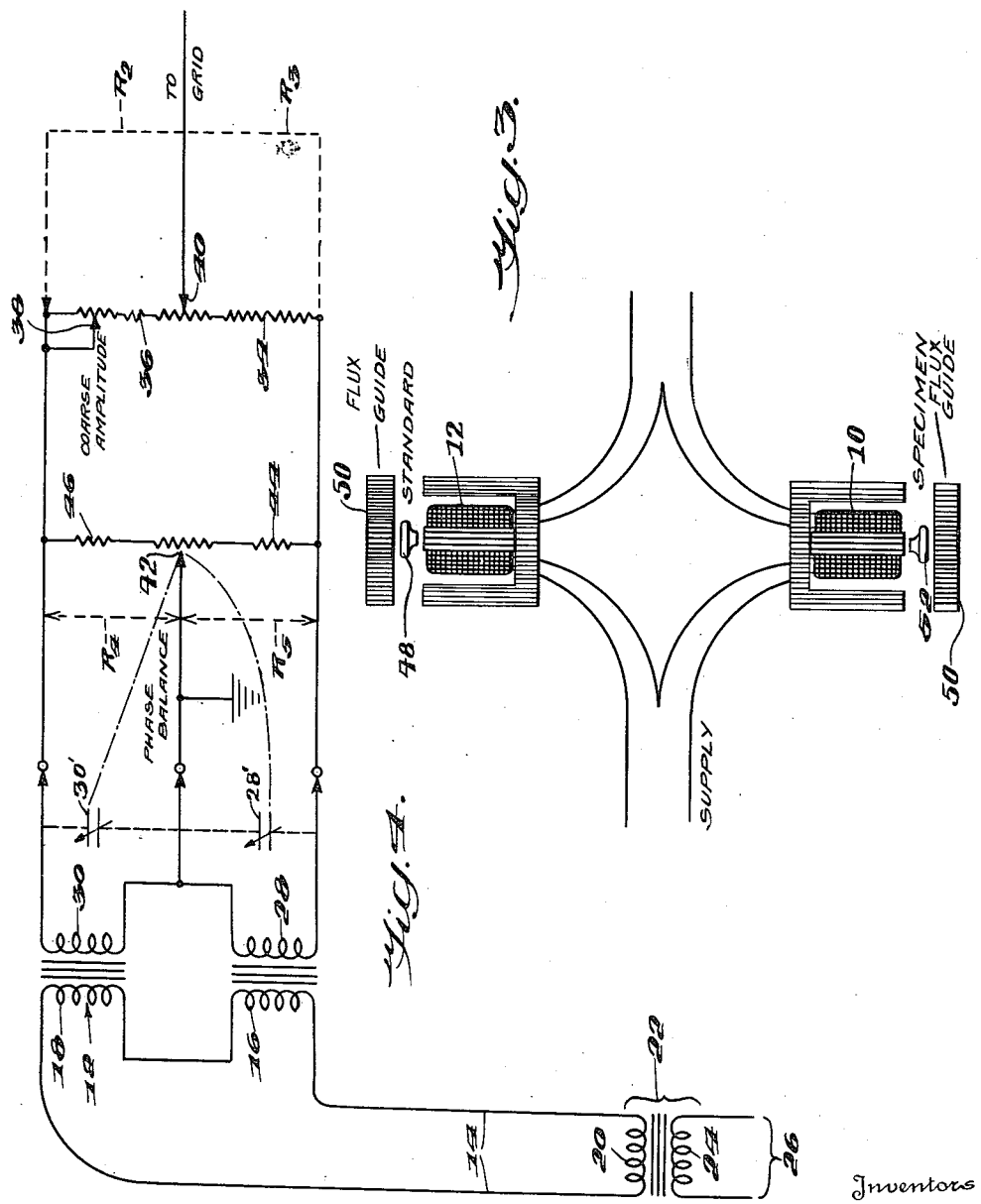

Patented Dec. 11, 1951

2,577,892

UNITED STATES PATENT OFFICE 2,577,892

MAGNETIC TESTING APPARATUS

Arthur T. Hatton, West Hartford, and Enoch K. Sprague, Woodbury, Conn., assignors to The Patent Button Company, Waterbury, Conn., a corporation of Connecticut Application November 29, 1945, Serial No. 631,669

13 Claims. (Cl. 175—183)

This invention relates to a device for differentiating and assorting metallic members having ferrous metal components, or members having properties which affect a magnetic field. More specifically it relates to an apparatus which will detect and reject defective metallic buttons formed of magnetic materials or other articles formed of similar materials by comparing each button with a standard specimen with respect to the amount of magnetic metals present therein. It is a principal object of the invention to provide such apparatus.

An object of this invention is to provide electronic means for detecting the presence or absence of ferrous metallic components of a button as compared with a standard button.

A still further object of the invention resides in providing such an apparatus with an inductance bridge of a special type and suitable electronic circuits therefor.

In accordance with the invention, the induction bridge includes two open core transformers connected with two of its arms while the other two arms of the bridge are made up of resistance elements having both resistance and distributed capacitance. Moreover, this bridge departs from conventional practice in that the power is not supplied directly across the extreme points, but instead is introduced by inductive coupling from two primary windings wound on the cores of the transformers. Accordingly, it is an object of the invention to provide an inductance bridge so constructed.

Because it is practically impossible to obtain commercial transformers having inductance values which are identical, this invention has for a further object the provision of means for correcting for the variations of inductance in such transformers in which the distributed capacitance of the bridge circuit and leads is utilized to obtain phase balance.

Still further, this invention contemplates the use of an indicator for bridge balance, the indicator comprising an electron ray tube of the "Magic Eye" type. While the conventional method of using such tubes is to apply the direct current signal voltage directly between the grid and the cathode, the present arrangement contemplates the application of the inverse alternating current signal voltage directly across the grid and the cathode of the electron ray tube whereby phase displacement will be indicated as a flutter on the shadow of the target and the amplitude of the bridge will be indicated by the steady condition of the shadow on the target.

A still further object of this invention is to employ a balanced electronic timing device to indicate the presence of imperfect or defective elements being examined, the absence of an element, and also to provide means for indicating the failure of various circuits in the apparatus.

Yet another object of this invention is to provide an improved electronic detector and indicator circuit to be used in conjunction with an inductance bridge to indicate by sequence operation the passage, within predetermined time intervals, of a continuous supply of articles having a desired magnetic characteristic, and which will also indicate either the failure of the sequential passage of articles within the required time interval or the passage within the required time interval of an object not having the desired magnetic characteristic.

Other and further objects and advantages of this invention will become apparent from a consideration of the following specification and the drawings annexed thereto, in which:

Fig. 1 comprises a block diagram of an electronic discriminator in accordance with the invention;

Fig. 2 comprises a complete wiring diagram of an electronic discriminator apparatus in accordance with the invention;

Fig. 3 is a diagrammatic representation of the transformer portion of the bridge showing the relation of a specimen under test conditions to the standard specimen;

Fig. 4 is an enlarged circuit diagram of the bridge circuit in accordance with the invention; and Fig. 5 is an enlarged circuit diagram of a rectifier circuit adapted to furnish a D. C. signal for the detector circuit.

Referring now more specifically to the drawings, reference characters 10 and 12 indicate two open core E-type transformers which form two arms of an inductance bridge. In Figs. 2, 3 and 4 of the drawings, the primary windings 16 and 18 of the two transformers 10 and 12 are shown as connected in series, the primaries being connected across an exciter line 14 connected to the secondary 20 of the transformer 22 whose primary 24 is connected across the main lines 26. This bridge is unique in that the power supplied thereto is not applied directly across the extreme points of the bridge but is, instead, introduced through inductive coupling from the primary windings 16 and 18 of the transformers to the secondaries 28, 30 thereof also connected in series.

The usual form of inductance bridges permits the variation of the inductance of one arm of the bridge, while the bridge described herein responds to changes of electromotive forces which are induced in its adjacent arms as a result of a change of the magnetic coupling between primary and secondary windings caused by the interjection of the specimen under test.

As heretofore mentioned, the transformer is designed as an open core transformer using laminations of the E type. The coils are wound on the center leg of the E and fill the spaces between the center leg and the two outside legs. It has been found from experimentation that this open core construction offers a magnetic field which is more responsive to changes in the magnetic field than is the case when other types of transformers have been utilized, such as the open coil type.

Reference is now made to Fig. 3 of the drawings in which it is seen that the transformer 12, which as represented herein has its core partially completed by a standard button 48, while transformer 10 has its core partially completed by the specimen button 52. From the foregoing it becomes apparent that the specimens under test become a part of the magnetic circuits of one of the two transformers which make up the inductance bridge, while a similar complement to the magnetic circuit of the other arm or transformer is effected by the use o. a standard button known to have all of the required parts of ferrous material.

In order to take full advantage of the transformation ratio, the transformers 10 and 12 are provided with high impedance secondaries 28 and 30, and designed for operation into the grid circuit of a vacuum tube 32 of an amplifier unit to be described.

The remaining arms of the bridge are made up of two fixed resistors 34 and 36 together with two potentiometers 38 and 40. The potentiometer 38 is provided for coarse amplitude adjustment while the potentiometer 40 gives fine adjustment. Such a construction permits the resulting signal to appear between the arm of the fine adjustment potentiometer 40 and the ground. The output of the bridge at these points is available for amplification by conventional methods.

Because of the difficulty of obtaining commercial transformers having identical inductance values, it has been found necessary to introduce a phase balancing circuit in order to effectively compensate for the variations of inductance. This phase balancing is achieved by employing the distributed capacitance which normally exists between the output leads of the windings 28 and 30 and the ground. If this interlead capacitance is represented by the capacitors 28' and 30' connected as shown by the dotted lines on Figs. 2 and 4 of the drawings the operation of the phase balancing circuit is obvious.

The phase balancing circuit is composed of a series connection of two fixed resistors 44 and 46, together with a potentiometer 42 whose arm is grounded. Now when the ratio of $R_2/R_3$ (See Fig. 4) is equal to the ratio of $R_4/R_5$, the effect of the interlead capacitance is zero. Minor variations of either of the two potentiometers will tend to place the capacitor across one or the other of the resistive arms. The potentiometer 40 will also cause a variation of the output amplitude whereas the potentiometer 42 will not appreciably influence the output amplitude. Therefore, the potentiometer 40 provides an amplitude balancing control whereas the potentiometer 42 provides a phase balancing control whereby an effective capacitance may be introduced in one or the other of the inductive bridge legs to achieve a desired inductance and phase balance.

Through the use of such apparatus it is possible to obtain absolute balance at the output of this bridge for any conditions which prevail in the magnetic circuits of the two transformers. For conventional operation, standard buttons 48 having equal magnetic characteristics would be inserted in the two transformer cores and the device would be balanced for both amplitude and phase under these conditions.

As shown in Fig. 3, this invention contemplates the use of flux guides 50 composed of a small stack of laminations, each of which are positioned outside of the standard and specimen buttons 48 and 52, respectively, in order to increase the amount of flux influenced by the buttons. These flux guides are placed in the same plane as the laminations of the transformers. In order to obtain best possible operating conditions the buttons 48 and 52 are placed as close as possible to the cores of the transformers 10 and 12 during the test, and the flux guides 50 are placed as close as possible to the farther side of the buttons.

The effect of the flux guides 50 is to concentrate the flux so as to lend emphasis to the inductance of the buttons when the buttons are directly in the plane of the core of the transformers. This also has the effect of permitting the buttons to be spaced more closely upon the conveyor belt (not shown) which carries the buttons into the testing field. Fig. 3 illustrates the relative positions of the transformers 10 and 12, the buttons 48 and 52 and the flux guides 50. The transformers are placed in the same mounting plane for convenience although it is also possible to use one at a point remote from the conveyor belt if space is at a premium. The arrangement illustrated facilitates the wiring and helps to maintain symmetry of the circuit.

In Fig. 2, the output of the bridge is shown as connected through the potentiometer 40 to a three stage amplifier unit of the conventional type. This amplifier employs two pentode tubes 32 and 54, upon the grid of the first of which is impressed the alternating current output of the bridge. The second stage includes a gain control of the conventional grid and potentiometer type. The third stage utilizes a triode 56 of standard design the output of which is coupled to the primary winding 60 of a transformer 58 having a high secondary impedance.

A half-wave diode rectifier 63 operates from the high impedance output secondary 62 of the amplifier. As seen in Figs. 2 and 5 the rectifier is connected in series with a load resistor 64 bypassed by a capacitor 66. This rectifier circuit is designed to furnish a direct current signal of negative polarity from the bridge output signal to the grid of the discriminator tube 68 in the detector circuit through the lead 63', switch contacts 122' and lead 68'. The proper bias is furnished to tube 68 through adjustment of potentiometer 80.

An indicator for determining bridge balance is provided, the indicator comprising an electron ray tube 70 commonly known as a "Magic Eye" tube. Whereas, the conventional method of using such a tube is to apply the direct current signal voltage directly between the grid 72 and the cathode 74 thereof, in the present circuit the alternating voltage appearing across the rectifier 63 is connected directly across the grid 72 and the cathode 74 of the electron ray tube 70. As seen in Figures 2 and 5 the grid 72 is connected directly with the plates 73 and 75 of the rectifier 63 by lead lines 77, 79, while the cathode 74 of the tube 70 is connected with the cathodes 81 and 83, of rectifier tube 63 by leads 85 and 87. Such an arrangement facilitates the balancing of the bridge circuit by indicating phase displacement as a flutter of the shadow on the electron ray target, while the amplitude of the output of the bridge is indicated by the steady condition of the shadow on the target. In using this indicator the phase balancing control 42 is adjusted to reduce the flutter to a minimum, after which the amplitude adjusting control 40 is varied until the minimum signal appears on the target when standard buttons 48 are inserted in the magnetic fields of both transformers 10 and 12.

The detector circuit comprises a simple triode detector 68 having a relay 76 connected in its plate circuit and normally energized by the flow of plate current. The plate current of this detector tube is limited by a resistor 78 disposed in the cathode circuit. This current is adjusted by means of a biasing potentiometer 80 which is in series with a protective relay to be described below, and is connected across a full-wave copper oxide bias rectifier 82 across a low voltage tap 84 of the low voltage transformer 22 in the power pack to supply negative bias voltage to tube 68. As seen in Fig. 2, the negative voltage signal output of the rectifier circuit 63 is also normally connected between the grid 86 and the ground circuit of the detector tube 68 so that any signal appearing on the output of the rectifier 63 impresses an additional negative voltage on the grid 86. The bias of this tube is then adjusted so that when the signal voltage from rectifier 63 is zero tube 68 is conductive and the relay 76 is energized or picked up. A small increment of the signal voltage from tube 63 will then cut-off tube 68 and cause the relay 76 to deenergize or drop out.

The timing circuit of this device is in duplicate and is arranged to operate a pair of indicating lights 88, 90 when the impulses received by the timer do not follow in regular sequence. Since the relay 76 in the detector circuit picks up each time that the signal voltage goes to zero through the presence of a good button, it is not desirable to have this relay operate an ejection valve 92 (Fig. 1) directly. This is due to the fact that a failure in the amplifier or bridge circuits will cause the relay 76 to respond in the same manner as when a good button is in the field of the bridge. The present timer provides a novel method of circumventing this possibility by depending upon the repetitive action of the detector to alternately reset each of the two timing devices.

In accordance with this phase of the invention, the relays 102, 104 in the plate circuits of the tubes 94 and 96 comprising this timer are normally de-energized because of a negative bias introduced through the action of the detector relay 76 which applies a charging voltage to the CR circuits including capacitors 98 and 100, and resistors 98' and 100' in the grid circuits of the timer. Capacitors 98 and 100, together with resistors 98' and 100', comprise electronic timing circuits in which the capacitors 98 and 100 are repeatedly charged in sequence through the sequential operation of relay 76 to be energized and deenergized within regular time intervals as objects having the desired magnetic characteristic pass through the inductance bridge test point. The condensers 98 and 100 are continually discharged through resistors 98' and 100', and if charging voltage fails to appear within the correct sequence time interval due to either the failure in the sequence passage of objects or the passage of an object not having the desired magnetic characteristic to produce zero signal voltage from rectifier 63 and thus make tube 68 conductive to energize relay 76, one or the other of tubes 94 or 96 will become conductive to energizer relays 102 or 104 and operate the annunciator 106 (Fig. 1) to be described below.

The timing circuit is synchronized with the speed of the conveyor belt (not shown) by means of the bias control 107 and contacts 109 of relay 76 in the grid circuits of the timer to supply a requisite amount of charging current to thus determine the discharge time of the CR timing circuits. A balancing control 108 is provided to equalize the discharge rate on the tube capacitors 98 and 100.

The annunciator system includes a pilot light 114, a trouble light 88, and an indicator light 90 for rejections. The pilot light 114 is connected directly across the supply line 26 by lines 115, 117, 119, 121, 123, 125, and 129, and indicates that the required power supply is connected. The reject light 90 will operate each time that a good button fails to appear in the field of the transformer 10 at the prescribed time, while the trouble light 88 operates whenever a condition prevails which seems to indicate the continual presence of a good button or the continued absence of any signal from the bridge, the amplifier, or the rectifier.

Light 88 is connected across the supply line 26 by lines 115, 117, 119, 160, contacts 104' of relay 104, line 161, line 125, and line 129. Light 90 is connected across supply line 26 by lines 115, 117, 119, 162, contacts 102' of relay 102, contacts 104' of relay 104, line 161, line 125, and line 129. Relays 102 and 104 (shown deenergized in Fig. 2) are maintained continuously deenergized during operation, and if relay 102 becomes energized, light 90 is lit, while energization of relay 104 lights lamp 88.

If either the reject 90 or the trouble lights 88 remain in operation for more than fifteen seconds, a thermal relay 116 operates to close the circuit to an audible alarm (not shown). Such an alarm will, of course, immediately call the condition of the apparatus to the attention of a supervisor.

The heater of thermal relay 116 is energized during operation by current from supply line 26 through the following circuit: lines 115, 117, 119, 163, switch 124, contacts 102' and 104', lines 161, 125 and 129. The contacts 177 of relay 116 are normally closed when the heater is cold. The heater is in parallel with the solenoid valve 92 which is energized during normal operation. When relay 102 or relay 104 remains deenergized, the circuit to the solenoid valve is broken causing continuous rejection of articles being tested, and the circuit to the heater of thermal relay 116 is broken, permitting the relay to cool and contacts 177 to close, energizing visual and audible alarms.

The protective features of this invention include instrumentalities to prevent complete failure of the apparatus under abnormal conditions by means of fuses and protective relays. A cartridge fuse 118 is placed in the main supply line 26 to protect against failure in the power pack circuit. A protective relay 120 is connected in the bias supply circuit so that if the bias voltage fails to appear or falls below its normal value, the tubes will not be injured by excessive plate current. The drop out of the relay 120 causes the disconnection of the timing circuit so that the trouble light 88 will immediately indicate the nature of the trouble. The relay 120 has its contacts open when it is deenergized, that is, when it is dropped out.

This invention also contemplates the provision of test switches for isolating various sections of the apparatus whereby independent testing may be conducted.

The bridge test switch 122 has three positions. The center position comprises the normal operating position. When this switch is turned to the right, the input of the amplifier is short-circuited making it possible to check the amplifier by means of the indicator tube 70 to ascertain that no extraneous signals appear in that circuit. When the switch 122 is turned to the left, the output of the amplifier is disconnected from the grid of tube 68 making it possible to adjust the plate current of the detector tube 68 in the same manner as that which prevails when no signal is received from the rectifier 63.

The switch 124 bearing the legend "Time Switch" is arranged for the purpose of checking the timing circuit and/or the detector circuit without causing the operation of the audible alarm. It is desirable also to use this time switch when the apparatus is first set in operation so that the thermal relay 116 will have sufficient time to open the contacts 117 of the audible alarm before the alarm is connected into the circuit through the time switch 124.

A test switch 150 is provided to connect a milliammeter 152 in a manner to provide proper indicating means for adjusting the current through the plates of tubes 68, 94 and 96. These three tubes have in their plate circuits at a point common to line 148 meter shunts A, B, and C, respectively. Since the positive side of meter 152 is also common to line 148, it is only necessary to switch the negative side of said meter to negative sides of shunts A, B, and C by switch 150. The positive pole of switch 150 shown in Fig. 2 was provided in case it is desired to apply different plate voltages to the various tubes. The leads A, B and C of the switch 150 are connected to the respective points A', B' and C' of the respective meter shunt resistances in series with relays 76, 102 and 104, in order to read the current flow through the relays and their associated control tubes. The switch 150 is provided with an additional unused contact point whereby the milliammeter 152 may be entirely removed from the circuit, if desired.

The power pack comprises the transformer 22 which was described above as furnishing voltage for both the copper oxide rectifier 82 and for the exciter line 14. In addition thereto, the power pack also includes the transformer 130 having a primary 132 connected directly across the main line 26. The transformer 130 is provided with the secondary coils 134, 136 and 138. This power pack is of the conventional type employing a full-wave rectifier 140 and a simple L filter. The output from this filter is fed to the above-described amplifier circuits across the two tube voltage regulating circuit which includes the tubes 142 and 144 arranged to deliver voltages of a higher and lesser degree. The higher voltage is fed to the three amplifier stages discussed above through lead line 146 and the usual form of de-coupling resistors and capacitors, while the lower voltage is fed to tubes 68, 94 and 96 through the line 148. The secondary 134 provides the voltage for the filaments of tubes 32, 54, 56, 63, 68, 94 and 96 by connection of the terminals 6 and 8 with the terminals 2 and 4 of the transformer.

The operation of the apparatus is as follows. The main line switch 200 is closed supplying power to the transformers 22 and 130. The bridge is then balanced by adjusting the amplitude and phase balance controls 40 and 42 until the shadow appearing discloses a minimum of flutter at a minimum of signal.

Thereafter, a standard button 48 having the desired ferrous characteristics is introduced into the flux field of transformer 12 and a similar button is inserted in the field of transformer 10. The detector circuit is then adjusted so that the signal voltage on tube 68 is zero, causing the relay 76 to pick up.

The conveyor system is then synchronized with the timing circuit by adjusting the potentiometer 107 with respect to tubes 94 and 96 through the operation of switch 109.

These preliminary steps having been completed, the device is ready to operate. From the foregoing it is seen that so long as a button having the same magnetic characteristic as the test button appears in the field of transformer 10, within the required sequential time interval, there will be no indication of a faulty button or operation of the reject solenoid 92 as relay 76 will be alternately energized and deenergized as a good button passes through the field of the search transformer 10 within the required time interval. However, should an imperfect button appear in the test field there will be a negative polarity incremental change of signal voltage to tube 68 which will maintain the tube 68 in the cut-off condition for a period of time greater than the discharge time interval of condenser 100 and resistor 100', with the relay 76 remaining energized and the tube 94 becoming conductive to actuate relay 104 whereby the solenoid 92 will operate to reject the faulty button. Simultaneously therewith through the above described circuits the reject light 90 will operate affording visual means for ascertaining the function of the device.

If for some reason the device continues to indicate by continuous conduction of tube 68 the presence of a good button in the test field during the time interval of the conveyor action when no button is supposed to be in the test field, the thermal relay 116 will operate to close the circuit to the trouble light 88 and also to the auditory alarm. The operator will then make tests of the various circuits in the manner described above until the trouble is located and rectified.

While the embodiment of the invention specifically disclosed demonstrates the application thereof to buttons having a ferrous component it is to be understood that this invention will find utility in connection with the examination of any test specimen having magnetic qualities or characteristics. In a similar manner, while the apparatus illustrated and described herein refers to the connection of the primary windings of the transformers 10, 12 as being in series, it is obvious that the same may be connected in parallel.

We also wish to point out that the words "acceptable" and "unacceptable" in the claims are used in a broad sense to indicate, respectively, standard articles, and articles departing from the standard. There may, of course, be variations in the extent by which an article may depart from the standard and still be acceptable, depending upon factors such as the type of article being tested and the degree of uniformity desired.

The invention has been described in considerable detail. It is to be understood, however, that the illustrations and description are merely explanatory of one embodiment and that the invention is not to be limited to the embodiment described and illustrated.

What we claim is:

1. An inductance bridge comprising a pair of transformers having their primary windings connected in series and with a power source, the secondaries of said transformers being connected in series, said transformers forming two arms of said bridge, resistance elements forming the other two arms of said bridge, an amplitude control for adjusting said resistance elements for both resistance and capacitance and phase balancing means comprising a plurality of resistance and capacitance elements connected in series and across said other two arms of said bridge, at least one of said last-named resistance and capacitance elements comprising a potentiometer, the variable arm of which is connected between said secondaries of said transformers, and amplifier means connected with the output of said bridge, means coupling the output of said amplifier with a rectifying circuit, and bridge balance indicating means, said indicating means comprising an electron ray tube having its grid and cathode connected directly across the output of said rectifier circuit, whereby the condition of phase balance is indicated by the degree of flutter of the ray tube shadow and the condition of amplitude balance is indicated by the average angle of the ray tube shadow.

2. In an inductance bridge circuit, a pair of transformers having their primary windings connected in parallel and with a power source, the secondaries of said transformers being connected in series, said transformers forming two arms of said bridge, resistance elements forming the other two arms of said bridge, an amplitude control for adjusting said resistance elements for both resistance and capacitance and phase balancing, means comprising a plurality of resistance and capacitance elements connected in series and across said other two arms of said bridge, at least one of said last-named resistance and capacitance elements comprising a potentiometer, the variable arm of which is connected between said secondaries of said transformers, and amplifier means connected with the output of said bridge, means coupling the output of said amplifier with a rectifying circuit, and bridge balance indicating means, said indicating means comprising an electron ray tube having its grid and cathode connected directly across the output of said rectifier circuit, whereby the condition of phase balance is indicated by the degree of flutter of the ray tube shadow and the condition of amplitude balance is indicated by the average angle of the ray tube shadow.

3. An article testing device, comprising a power source, a pair of transformers having their primary windings connected with said power source, the secondaries of said transformers being connected in series, means for positioning a standard article in the flux field of one of said transformers, means to pass articles to be compared with said standard article through the flux field of the other transformer one after the other at regular intervals, said last mentioned means including a test station, an inductance bridge having two of its arms formed by said transformers, resistance elements forming third and fourth arms of said bridge, an amplitude control for adjusting said resistance elements for both resistance and capacitance, phase balancing means comprising a plurality of resistance and capacitance elements connected in series and across said third and fourth bridge arms, at least one of said last-named resistance and capacitance elements comprising a potentiometer, said potentiometer having a variable arm connected between the secondaries of said transformers, said bridge circuit being arranged to provide a predetermined variation in the bridge output when an acceptable article passes said test station, said variations coming at regular time intervals when a series of acceptable articles pass said test station, amplifier means receiving the output of said bridge, a rectifying circuit coupled with the output of said amplifier means, bridge balance indicating means comprising an electron ray tube having its grid and cathode connected directly across the output of said rectifier circuit, and means fed by said rectifying circuit and operable in response to a change in the predetermined variation of bridge output within the regular time interval for indicating the presence of a non-acceptable article at said test station.

4. A device as set forth in claim 3, said last named means comprising detecting means fed by said rectifying circuit, a normally operative indicating arrangement, control means requiring regular periodic readjustment to maintain said indicating arrangement inoperative, means controlled by said detecting means for supplying readjustment to said control means at each normal variation in the output of said bridge circuit, and means for adjusting said control means to correlate the periods between successive readjustments of said control circuit necessary to maintain said indicating means inoperative with the rate at which articles to be tested pass said test station, whereby the passage of a series of acceptable articles causes variations of the output of said bridge circuit to occur sufficiently close together in time to cause said control means to maintain said indicating means inoperative, the passage of an unacceptable test piece causing a change in the regularity of the variations in the bridge output which causes a time gap in the readjustment of said control means sufficient to permit said indicating means to operate.

5. In apparatus for testing metallic articles to distinguish between acceptable and non-acceptable articles, a test station, means for passing articles to be tested past said test station at regular rate intervals, an inductance bridge including at least one transformer at said test station, the mutual conductance of which is varied in a known manner by the passage of an acceptable article past said test station to produce a responsive variation in the output of the bridge, said output variations occurring at a regular rate when a series of acceptable articles pass said test station, and means responsive to variation in the regularity of said bridge output variations within the regular rate intervals to indicate the presence of nonacceptable articles at the test station.

6. The combination as set forth in claim 5, said last-named means of claim 5 including indicating means, a pair of timing circuits requiring continuous regular periodic resetting to maintain said indicating means inoperative, means for continuously and alternately resetting each of said timing circuits in response to said regular variations in the output of said bridge, and means operable in response to irregularity in the resetting of said timing circuits to permit operation of said indicating means to indicate the presence of a nonacceptable test piece at the test station.

7. The combination set forth in claim 6, said resetting means including a relay operable in response to said bridge output variations.

8. The combination set forth in claim 6, said resetting means including a relay operable in response to said bridge output variations, and a detector interposed between said bridge and said relay.

9. The combination as set forth in claim 5, said last named means comprising indicating means, a pair of relays controlling said indicating means, at least two electronic means separately controlling each of said relays and normally operable to operate said relays in such manner as to cause operation of said indicating means, and means controlling said electronic means and operable periodically in response to the output variations of said bridge circuit for causing said electronic means to maintain said pair of relays in a condition in which said indicating means is inoperative.

10. The combination as set forth in claim 5, said last named means comprising indicating means, a pair of relays controlling said indicating means, at least two electronic devices separately controlling said relays and normally operable to operate said relays in such manner as to operate said indicating means, a third relay operable in response to the periodic output variations of said bridge circuit to cause first one and then the other of said electronic devices to assume a condition in which said first two relays are caused to maintain said indicating means inoperative, and means cooperating with said electronic devices to maintain each of said electronic devices in said last mentioned condition for the period of time normally coming between successive operations of each device by said relay during the passage of a series of acceptable test pieces past said test station, whereby the passage of an unacceptable test piece past said test station causes a variation in the regularity of operation of said third relay, thereby permitting one of said electronic devices to operate one of said pair of relays to cause operation of said indicating means.

11. The combination as set forth in claim 5, said last named means comprising indicating means, a pair of relays connected to actuate said indicating means when said relays are energized, a pair of electronic tubes each controlling one of said relays and normally operable to energize said relays, a third relay operable in response to the periodic variation of the output of the bridge to introduce a bias periodically first to one of said first two electronic tubes and then to the other to cause said first two tubes periodically to assume a condition in which said first pair of relays are deenergized, and circuit means connected with said first two tubes for housing each of them to maintain said last mentioned condition for the period of time normally falling between successive introductions of bias to each of said first two tubes during the passage of a series of acceptable test pieces past said test station, whereby the passing of an unacceptable test piece past said test station causes a delay in the introduction of said bias to one of said tubes which permits said tube to energize one of said relays to operate said indicating means.

12. The combination as set forth in claim 5, said last named means comprising indicating means, a pair of relays connected to actuate said indicating means when said relays are energized, a pair of electronic tubes each controlling one of said relays and normally operable to energize said relays, a detector tube having a grid, means impressing a negative bias on said grid when said bridge circuit reacts to the presence of an acceptable piece, a third relay in series with the plate of said detector tube, means adjusting the bias of the detector tube so that the third relay is energized when the signal voltage fed to the grid of the detector tube is zero and is deenergized upon a change in the signal voltage, means operable by said third relay to introduce a bias periodically first to one of said first two electronic tubes and then to the other to cause said first two tubes periodically to assume a condition in which said first pair of relays are deenergized, and circuit means connected with said first two tubes for causing each of them to maintain said last mentioned condition for the period of time normally falling between successive introductions of bias to each of said first two tubes during the passage of a series of acceptable test pieces past said test station, whereby the passing of an unacceptable test piece past said test station causes a delay in the introduction of said bias to one of said tubes which permits said tube to energize one of said relays to operate said indicating means.

13. Apparatus according to claim 5, in which said inductance bridge includes two transformers, the second of which forms part of a datum station adapted to cooperate with a standard article located in proximity to said second transformer to complete its flux path.

ARTHUR T. HATTON.
ENOCH K. SPRAGUE.

REFERENCES CITED

The following references are of record in the file of this patent:

UNITED STATES PATENTS

| Number | Name | Date |
|---|---|---|
| Re. 21,003 | Knerr | Feb. 14, 1939 |
| 1,291,861 | Harlow | Jan. 21, 1919 |
| 1,897,634 | De Forest | Feb. 14, 1933 |
| 1,957,222 | Mershon | May 1, 1934 |
| 1,983,388 | Moore | Dec. 4, 1934 |
| 2,009,447 | Hart | July 30, 1935 |
| 2,040,495 | Nichols | May 12, 1936 |
| 2,045,769 | Geffken et al. | June 30, 1936 |
| 2,269,152 | Hathaway | Jan. 6, 1942 |
| 2,326,313 | Trucksess | Aug. 10, 1943 |
| 2,337,132 | Shaw | Dec. 21, 1943 |
| 2,357,512 | Gaiser | Sept. 5, 1944 |
| 2,434,203 | Farrow | Jan. 6, 1948 |

OTHER REFERENCES

Wireless World, July 1943, pages 202–204.